(No Model.)
L. K. BRYANT.
PACKING VESSEL.
No. 368,704. Patented Aug. 23, 1887.
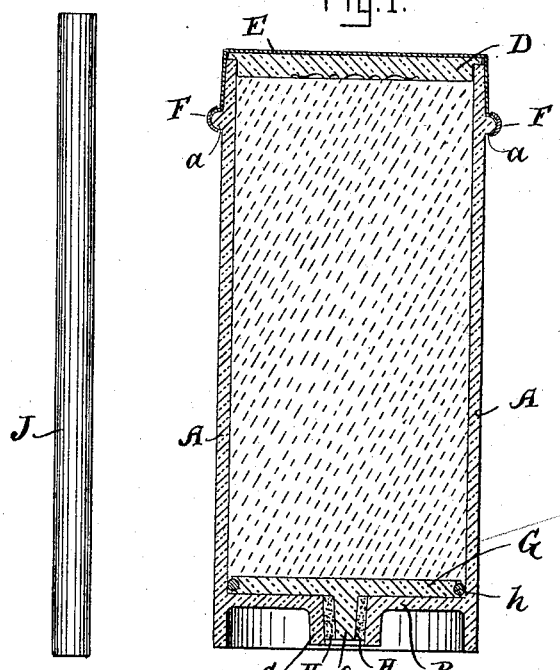
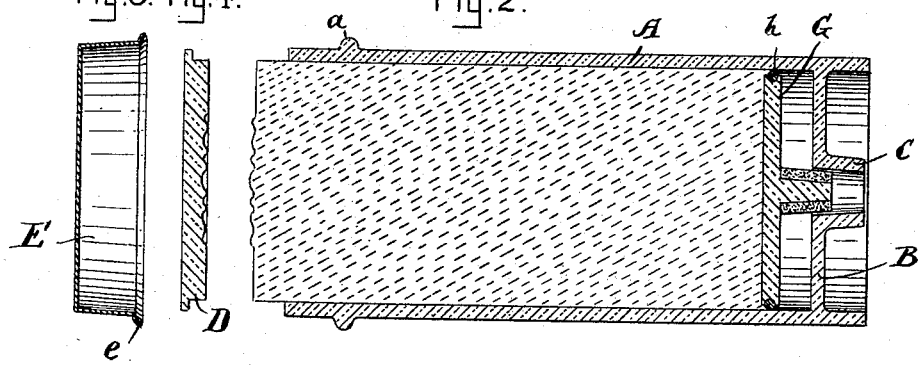
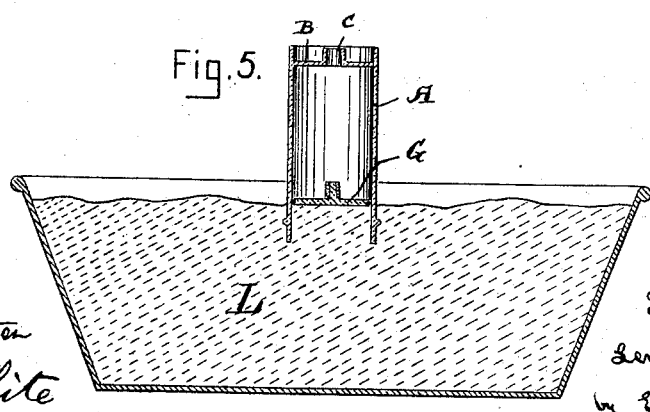

UNITED STATES PATENT OFFICE.

LEVI K. BRYANT, OF LAWRENCE, MASSACHUSETTS.

PACKING-VESSEL.

SPECIFICATION forming part of Letters Patent No. 368,704, dated August 23, 1887.

Application filed January 13, 1887. Serial No. 224,313. (No model.)

*To all whom it may concern:*

Be it known that I, LEVI K. BRYANT, a citizen of the United States, residing at Lawrence, in the county of Essex and State of Massachusetts, have invented a new and useful Improvement in Packing-Vessels for Butter, Compressed Meats, and such like Substances, of which the following is a specification.

The object of my invention is to produce a packing-vessel for butter, compressed meats, and such like substances, whereby the contents will be preserved and can be removed in slices or portions as required; and the invention consists of certain details of construction, hereinafter fully described, and pointed out in the claims.

Referring to the accompanying drawings, Figure 1 represents a longitudinal section of a packing-vessel embodying my invention. Fig. 2 is a longitudinal section with the cover removed and the contents pushed partly out. Fig. 3 is a section of the metallic cover. Fig. 4 is a section of the loose or inner cover. Fig. 5 shows the method of filling the vessel with butter.

A represents a jar, of glass, earthenware, or other suitable material, the bottom B being a short distance above the lower outer edge, so that a short neck, C, projecting from the bottom of the jar, will be protected. The object of this neck will be explained hereinafter.

D is a loose cover provided with an ornamental design, the name or trade-mark of the packer, either in relief or *in intaglio*, so that the design may be imparted to the butter or other substance contained in the jar.

E is a metallic cover of the form shown, (see Figs. 1 and 3,) that is slightly tapering and provided at its lower edge with a lip, e, that fits over a rib or projection, a, on the outside of the jar.

After the loose cover D and the metallic cover E have been placed on the jar, they are secured by an elastic band, F, that is sprung on partly onto the lip e and partly onto the projection a, as shown in Fig. 1, thereby forming an air-tight joint.

G is a piston made of the same material as the jar A, and provided on its lower side with a teat or projection, g, around which is placed a ring, H, of cork, rubber, or other suitable elastic material, so as to form an air-tight joint when the piston is at the bottom of the jar. Around the edge of the piston is secured a suitable packing, h, so as to form an air-tight joint between the piston and the inside of the jar.

J is a stick or rod for pressing the piston G out of the jar A.

In filling jars constructed according to my invention I prefer the method shown in Fig. 5, in which K is a large vessel filled with butter, L, and preferably rather deeper than the jar to be filled. The jar is inverted, as shown, and is pressed down, the piston G resting upon the top of the butter. As the jar is filled with butter, the piston is forced upward and the air escapes from the opening in the neck C until all the air has been expelled and the piston is at the bottom of the jar A, when the packing H will tightly fit the neck C and exclude all air. It will be seen that the neck is tapering; therefore the space between the packing H and the neck C will not be closed until the piston is at the bottom of the jar. After the jar has been filled, the loose cover D is placed on the top. This cover is provided with a lip that rests on the upper edge of the jar, so that only a small portion projects down into the jar, and, when pressed tightly down, further compresses the butter, and the design on said cover is imparted to the butter. The metallic cover E is then placed over the top of the jar and an air-tight joint formed between them by the elastic ring F, as above described.

When it is desired to take out a portion of the contents of the jar, the covers E and D are removed and the piston G pressed outward by the finger or by the stick or plunger J, which will force the contents out at the top of the jar, as shown in Fig. 2, and when sufficient has been forced out it can be cut off level with the top of the jar and the covers replaced.

The elastic packing h on the piston G will retain it in any position in the jar, so that after a portion of the contents has been removed all air will be excluded and kept from the bottom of the butter, thereby keeping it perfectly sweet.

What I claim as my invention is—

1. A packing-vessel for butter, compressed meats, and such like substances, consisting of a jar provided with a short neck in its bottom, in combination with a piston provided with an elastic packing around its periphery, and a teat, also provided with an elastic packing to fit the neck in the bottom of the jar, substantially as shown, and for the purposes described.

2. A packing-vessel for butter, compressed meats, and such like substances, consisting of a jar, A, raised bottom B, provided with neck C, the piston G, provided with packing $h$, and teat $g$, fitted with packing H, in combination with the loose cover D, metallic cap or cover E, and elastic band F, substantially as and for the purposes set forth.

3. In a packing-vessel for butter, the loose cover D, provided with an ornamental design, trade-mark, or name of the packer, in combination with the metallic cap or cover E, elastic ring F, and a jar provided with a piston, substantially as shown and described.

In testimony whereof I have signed my name to this specification in the presence of two subscribing witnesses.

LEVI K. BRYANT.

Witnesses:
CHAS. STEERE,
E. PLANTA.